Patented Nov. 4, 1924.

1,513,730

UNITED STATES PATENT OFFICE.

ROGER ADAMS AND RUSSELL L. JENKINS, OF URBANA, AND ERNEST H. VOLWILER, OF CHICAGO, ILLINOIS, ASSIGNORS TO ABBOTT LABORATORIES, OF CHICAGO, ILLINOIS, A CORPORATION OF ILLINOIS.

ANÆSTHETIC COMPOUND.

No Drawing.   Application filed October 20, 1922. Serial No. 595,834.

*To all whom it may concern:*

Be it known that we, ROGER ADAMS and RUSSELL L. JENKINS, residing at Urbana, in the county of Champaign and State of Illinois, and ERNEST H. VOLWILER, residing at Chicago, in the county of Cook and State of Illinois, have invented certain new and useful Improvements in Anæsthetic Compounds, of which the following is a specification.

Our invention relates to the production of di-secondary-butyl amino alcohol esters of aromatic acids, having the general formula

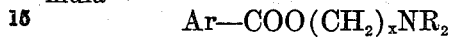

where Ar represents an aryl group containing a benzene nucleus, where $x$ represents at least one, and where R represents a secondary butyl group.

*General method of synthesizing compounds of this series.*

Benzoyl chloride or a substituted benzoyl chloride is dissolved in benzene and treated with a molecule of di-secondary-butyl amnio alcohol and the mixture refluxed about an hour; upon treatment of the reaction mixture with a dilute acid in order to dissolve all the basic compounds and making the aqueous layer alkaline with sodium hydroxide, the di-secondary butyl amino alcohol ester of the benzoic acid used is precipitated, and is extracted; treatment with an acid, such as hydrochloric acid, produces the corresponding salt.

An alternative method of preparation consists in treating a halogen substituted ester of the general formula $R-COO(CH_2)_xY$ (where R represents an aromatic nucleus, $x$ represents one or more, and Y represents a halogen) with di-secondary-butyl amine, and isolating the reaction product as above described.

*Specific compounds.*

A specific compound belonging to the general series as above defined is the β-di-secondary-butyl amino ethyl ester of para-amino benzoic acid, having the formula

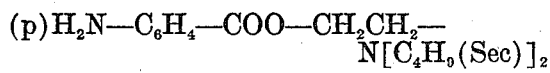

This compound may be prepared by either of the general methods described above. To prepare it by the first method given above, one mole of p-nitrobenzoyl chloride, in benzene as a solvent, is added to one mole of β-di-secondary-butyl amino ethyl alcohol and the mixture heated an hour on a water bath. (Di-secondary-butyl amino ethyl alcohol has not previously been described in the literature. It may be prepared by the condensation of ethylene chlorohydrin with di-secondary-butyl amine, and boils at 225-226° C. (corr.) at 750 mm.) The reaction mixture is then shaken with dilute hydrochloric acid and the aqueous layer treated with tin, and, if necessary, a little more hydrochloric acid. The temperature should be kept at about 50° so as to prevent hydrolysis so far as possible. When the spontaneous reaction has decreased, heat is applied to maintain the temperature at 50° for about an hour longer. The solution is decanted from the excess tin, diluted with water and the tin in solution removed by hydrogen sulfide. Upon filtering off the tin sulfide and making alkaline, the di-secondary-butyl amino ethyl ester of p-amino benzoic acid separates out. This may be taken up in ether and after the removal of the ether, treated with one mole of hydrochloric acid. In this way the monohydrochloride is produced; it is recrystallized from alcohol or water and melts at 185-187° C. Other salts of the base may be prepared in a similar manner.

Another specific compound belonging to the general series is the γ-di-secondary-butyl amino propyl ester of p-amino benzoic acid, having the formula

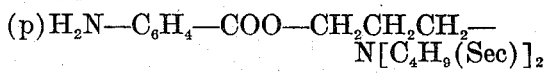

which may also be prepared by either of the above mentioned methods. In case the second method is employed, one mole of γ-bromo-propyl p-nitro benzoate is warmed to about 60° with one mole of di-secondary-butyl amine. The reaction mixture is washed with a little water to remove unchanged amine, and the residue extracted with dilute hydrochloric acid. Upon neutralization with sodium hydroxide, the free nitro base is obtained, which may then be reduced with tin and hydrochloric acid as above described. The monohydrochloride of the γ-di-secondary-butyl p-amino benzoyl propanol thus obtained, after recrystallization from alcohol or water, is a white solid melting at 164–165°.

Another specific compound belonging to the series is the β-di-secondary-butyl amino ethyl ester of benzoic acid. It may be prepared by condensing benzoyl chloride, in benzene solution, with β-di-secondary-butyl amino ethyl alcohol, whereupon the hydrochloride of the condensation product separates as an oil, which does not crystallize.

The di-secondary-butyl amino alcohol esters of aromatic acids above specified are either liquid compounds or low-melting solids, insoluble in water but readily soluble in the common organic solvents. All of the bases, as well as their salts, possess anæsthetic properties. When heated in aqueous solutions of alkalis, they undergo saponification to the corresponding amino alcohols and salts of the aromatic acids.

The scope of the invention should be determined by the language of the appended claims and should be interpreted as broadly as possible consistent with the state of the art.

We claim as our invention:

1. As a new article of manufacture, a compound having the general formula $$Ar-COO(CH_2)_xNR_2$$

where Ar represents an aryl group containing a benzene nucleus, where $x$ represents at least one, and where R represents a secondary-butyl group.

2. As a new article of manufacture, the di-secondary-butyl amino alcohol ester of an aromatic acid containing a benzene nucleus.

3. As a new article of manufacture, the γ-di-secondary-butyl amino propyl ester of p-amino benzoic acid, a compound possessing the structure:

$$(p)H_2N-C_6H_4-COO-CH_2CH_2CH_2-N[C_4H_9(Sec.)]_2$$

ROGER ADAMS.
RUSSELL L. JENKINS.
ERNEST H. VOLWILER.